Dec. 31, 1968          W. W. CLEMENTS          3,419,739
                    ELECTROMECHANICAL ACTUATOR
Filed April 22, 1966                          Sheet 1 of 3

WARNER W. CLEMENTS,
INVENTOR.

BY *Warner Clements*
REGISTERED PATENT AGENT

Dec. 31, 1968   W. W. CLEMENTS   3,419,739
ELECTROMECHANICAL ACTUATOR
Filed April 22, 1966   Sheet 2 of 3

United States Patent Office 3,419,739
Patented Dec. 31, 1968

3,419,739
ELECTROMECHANICAL ACTUATOR
Warner W. Clements, Los Angeles, Calif.
(13435 Java Drive, Beverly Hills, Calif. 90210)
Filed Apr. 22, 1966, Ser. No. 544,447
8 Claims. (Cl. 310—15)

My invention relates to electromechanical actuators of a new and distinctive genus.

For purposes of classifying the invention with relation to the prior art, the following can be stated: In common with nearly all prior-art electromechanical actuators, devices according to the invention harness magnetic forces rather than electrostatic ones. In common with a substantial class of such prior-art actuators, devices according to the invention produce reciprocating actuation and produce it directly without translation from continuously rotating actuation. In common with actuators in a subclass of the preceding, devices according to the invention incorporate permanent magnets as basic components. At the same time, in common with actuators in an other-and-different subclass, a very limited one, embodiments of my invention deliver a two-way-powered, self-sequencing output. (That is to say, upon the occasion of one electrical command, the actuating element is magnetically impelled in one operational direction; upon the occasion of the next electrical command, identical to the first, the actuating element is magnetically impelled in the opposite operational direction.) It should be carefully noted that the sub-classes named above have previously been mutually exclusive, no way ever previously having been found for basically incorporating permanent magnets in two-way-operated, self-sequencing devices.

However my invention is to be classified, it introduces differences over the prior art which are basic and profound. One of these is that in devices according to my invention mechanical actuation is *not* simultaneous with electrical energization. Rather, electrical energization takes place during a given period (which may be very brief) and mechanical actuation follows upon the close of this period. Another difference is that the amount of electrical energy consumed by my devices is *not*, as in prior-art devices, determined by the length of time required for completion of a stroke by the actuating element. Whether the stroke is completed in a few milliseconds, whether it takes minutes, or even if it takes months, the effecting of the stroke costs exactly the same in electrical energy. To constitute a third difference, the energizing electrical circuit is *not*, as in prior-art devices, required to be closed under conditions of minimum inductance and reopened under conditions of maximum inductance. Rather, the opposite applies. The circuit is closed when inductance is at a maximum and opened when it is at a minimum.

The significance of these and related differences needs to be explained. To begin with, it should be pointed out that there are many tasks for which a reciprocating actuator is, on the face of it, inherently better suited than a continuously rotating one. These tasks have been accomplished until now either by hydraulic actuators or by continuously rotating electric motors, the latter necessarily supplemented in each case by elaborate mechanical translating apparatus. One thinks of literally hundreds of short-stroke opening and closing, raising and lowering, and extending and retracting operations which are necessary in industry, transportation and consumer appliances. It is no accident of history that simple, direct-acting electromechanical actuators have been used in comparatively few of these applications. There are good reasons for this state of affairs, the principal one being that the simple actuator is enormously inefficient in applications where the stroke of its actuating element ("armature") must be relatively slow. The actuator is inefficient not just because it consumes a given power for a longer-than-optimal period, but also because that given power will be much too high to begin with, where armature operation is slow.

The trouble with electromagnetic actuators, and this includes those with continuously rotating armatures, is that their windings stand ready to gobble up the lion's share of the input power and dissipate it in the form of useless heat. The only way that a reasonable portion of the input power can be preserved to do useful work (and meet other losses) is to keep the velocity of the armature high. This is easy enough to do in the case of the continuously-rotating-type actuator (or "motor"), which may be conveniently geared down. But where the armature must be coupled directly to ordinary loads, and must start and stop those loads as well, the velocity to be desired is much too high to be attained. As a result, most, and often nearly all, of the input power goes into coil heating. Then, to make matters worse, this state of affairs is protracted for the entire time required to complete the necessarily slow stroke. Worse yet, if the device is a one-way-powered (spring-return) unit, it may be required to consume power for long periods with the armature at a standstill and true power efficiency at absolute zero.

Devices according to my invention avoid such energy wastage by being, in a sense, not electromagnetic, but *permanent* magnet actuators. If one attracts an iron object with a permanent magnet, there will be no power consumed no matter how slowly that object is permitted to respond. Further, once the object has reached the magnet, there will be no power required to hold it in place for no matter how long. My invention exploits both of the principles here involved, for the attainment of new levels of efficiency.

Besides coil heating, there are two other types of energy loss which are prominent in the operation of relevant prior-art devices. These are hysteresis and spark. Embodiments of my invention also avoid the latter losses to a great extent. Hysteresis loss is diminished because the permanent magnet which is employed replaces much iron or equivalent magnetic material which would otherwise be found in the magnetic circuit. Permanent magnets of the preferred type have almost zero hysteresis loss over the operating range imposed.

The loss of energy in the form of spark normally occurs upon the opening of the energizing circuit. With larger actuators, this has previously been a serious problem, not only because spark represents wasted energy, but because that energy is vented destructively on the switch contacts. By contrast, in devices according to my invention, the spark is minimal. This is because the opening of the switch contacts normally takes place at a time when the inductance "seen" by the electrical circuit is at a minimum instead of at a maximum.

In sum, the increase in efficiency which my invention brings about is sufficiently great to permit simple reciprocating electromechanical actuators to now be used in all those many applications for which they are otherwise suited, but from which they have previously been barred solely because of their lack of efficiency. Further, the advantage of efficiency is obtained in combination with certain other advantages. Notably, there is the advantage afforded by self-sequencing, which permits two-wire control with its simplified wiring and switching.

It is interesting to note that devices according to my invention possess many of the attributes of the piston-type hydraulic devices they are capable of replacing. For one thing, they can be designed to deliver a substantially constant force throughout the length of the stroke. For another, as already indicated, the input energy consumed per stroke remains constant no matter how slowly or quickly the stroke proceeds. Finally, the weight efficiency of the devices increases as the size increases, making very large actuators practical. (My experimentation has necessarily been confined to small models. But I have discovered no theoretical or empirical obstacle to the construction of truly huge units, say, on the order of many tons in weight.)

*Magnetic principles*

Just as the principles of an electrical circuit lie elsewhere than in the mechanical layout of its components, so do the principles of the present central invention lie elsewhere than in specific mechanical constructions. For this reason, embodiments of the invention are able to vary considerably in mechanical construction. They remain, however, identical on the level of magnetic arrangement.

Basic to that magnetic arrangement is the presence of an energizing permanent magnet, and magnetically conductive structure defining in conjunction with said magnet a closed magnetic circuit. By "closed" I mean that the location or "path" of the magnetic flux is substantially determined by the structure; I do not mean to rule out the inclusion of short air gaps which the flux must traverse in negotiating the circuit. As a matter of fact, the structure must provide for two variable air gaps arranged in series. The construction must be such that as one gap is opened the other is closed, and vice versa.

Some definition is required at this point. By a "variable" air gap, I mean one whose "reluctance" is adjustable. Reluctance, in turn, may be said to be a measure of the opposition the gap offers to being traversed by the flux. Changing the reluctance is stated as "opening" or "closing" the gap. It should not be overlooked that the reluctance of a gap is determined either by its area or its length, so that opening or closing a gap may consist in varying both of these parameters or either alone. In any event, a gap is "closed" by decreasing its reluctance, and "opened" by increasing its reluctance. As for the prescribed series arrangement of the gaps, this means only that the structure defining the magnetic circuit must be such that (the bulk of) the flux must traverse first one gap and then the other in the course of negotiating the circuit.

Next, there must be provided means for selectively shunting one or the other of the variable air gaps. An air gap is defined by the respective magnetically conductive members fronting it, and it is always possible to temporarily apply additional magnetic material to one or the other of such members right at the gap so as to decrease the reluctance thereof. This decrease is due to the provision of alternate or supplemental pathways by which the flux may leave one member and travel through the air to the other member. The additional magnetic material which is placed for such purposes is properly said to "shunt" the gap, by analogy with equivalent electrical and hydraulic functions. It should be noted that the shunting material can only be placed in contact with one or the other of the members defining the gap; if it were placed in contact with both at once it would effectively eliminate the gap rather than shunt it. (Further, as a practical matter, it would make impossible application at a variable gap, whose defining members must be free to move relative to each other.) As to which side of a gap the shunting material is applied, it clearly makes no difference, and this holds even in the case of a variable gap where one defining member will normally be movable and the other fixed. (When applied to the movable member, the shunting "position" must be considered relative to the latter.)

In the case of an air gap which is variable, if said gap is initially closed when additional magnetic material is placed in position to shunt it, the reluctance may be already so low that the actual shunting effect, initially at least, is negligible. However, if the gap then be nominally "opened" with the additional material maintained in shunting position, the shunting effect will become increasingly evident as the opening progresses. It will definitely counteract the increase in reluctance otherwise associated with gap opening. By "counteract," I mean that the expected decrease in permeance will be diminished or even reversed. (The analogy with electrical circuit arrangements is by no means strained. Comparable effects take place when one variable resistor is shunted with another.)

Given the arrangement of the magnetic circuit structure previously prescribed, it is clear that shunting that one of the two gaps which is closed at a given instant will produce a strong magnetic "attraction" which will tend to shift the movable part of the magnetically conductive structure in such a way as to close the other gap and open the shunted one. If then the shunting is transferred to the second gap, the reverse effect will take place. This can be repeated indefinitely, producing an alternating action in the movable part of the magnetic circuit structure (said movable part comprising one or more "armatures") which can be harnessed to do useful work. Further, it may be seen that by coupling the armature or armatures to the movable shunting material it is possible to make the shunting selection automatic. However, those skilled in the art will appreciate that the shunting material will stick tenaciously in either applied position, under the influence of the permanent magnet, and it would require at least as much energy to release it mechanically as would be developed by the resultant armature stroke.

The invention provides for the shunting material to be released from each shunting position, not by sheer mechanical force, but by temporarily doing away with the effect of the permanent magnet. To that end at least one coil or winding is incorporated, mounted in linking relationship to the magnetic circuit structure. If the coil or coils be briefly energized with a current of proper polarity and intensity, a magnetomotive force will be developed which will oppose, or buck out, that originating with the permanent magnet for a long enough time for the indicated shift of the shunting material to take place.

The foregoing outline of principles is not exhustive and has been included to give a preliminary view and establish some of the terminology to be subsequently relied upon. A fuller understanding may be gained from the descriptions of illustrative embodiments to follow, and to this end neither the matter dealing with construction nor that dealing with operation should be overlooked.

*Drawings*

FIGS. 1 through 3 are descriptive of a first embodiment of the invention.

FIG. 1 shows the device with movable parts in one of the two patterns of positioning which are stably held in the absence of coil energization or terminally reached after the cessation of previous energization. (The alternate pattern of stable positioning is essentially the mirror image of the one shown.) FIG. 2 shows movable parts in the pattern of positioning terminally reached during energization of the coil. This positioning is transitory, inasmuch as the coil is preferably de-energized as soon as it is reached.

FIGS. 4 through 6 are descriptive of a second embodiment of the invention. No sequence of operations is represented and all views represent the device with movable parts in the same pattern of positioning, namely, the positioning obtaining when device is in one of the two quiescent conditions it terminally reaches when de-energized.

FIGS. 7 through 10 are descriptive of a third embodiment of the invention.

FIG. 7 shows the device with movable parts in one of the two patterns of positioning which are stably held in the absence of coil energization and terminally reached after the cessation of previous energization. (The alternate pattern of stable positioning is essentially the mirror image of the one shown.) FIGS. 8 through 10 show movable parts in the pattern of positioning terminally reached during energization of the coil. The positioning is transitory, inasmuch as the coil is preferably de-energized as soon as it is reached.

Figures 1, 3:
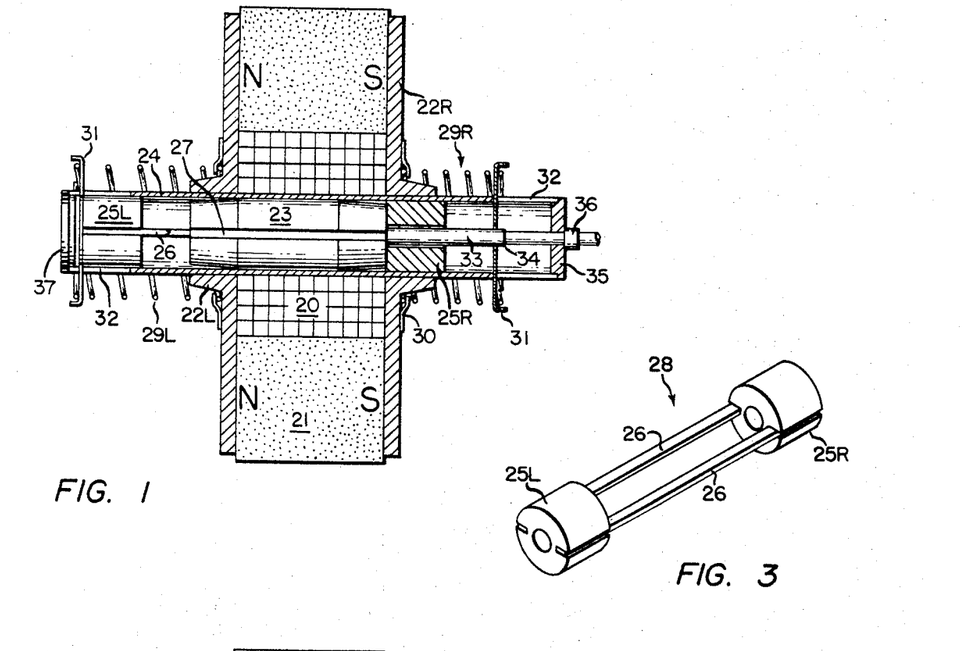
FIGS. 1 and 2 are central sectional views, each with smaller central parts left unsectioned, as appropriate, for clarity.
FIG. 3 is an isometric view of a single component assembly, namely, the auxiliary armature.
Figure 2:
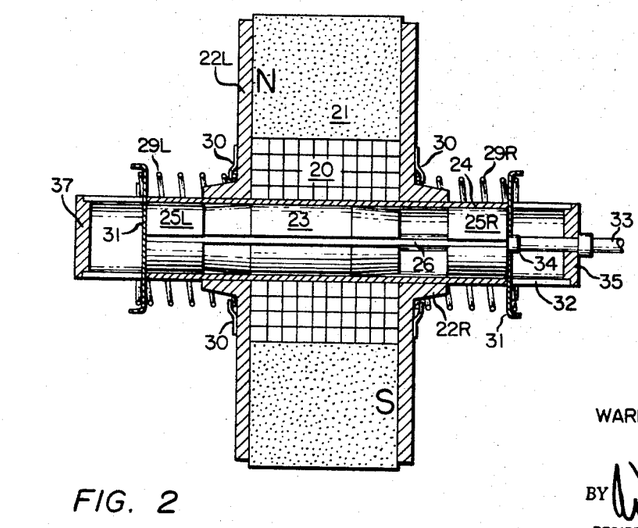

*Construction of illustrative embodiment of FIGS. 1–3*

The component designated 20 is an ordinary solenoidal coil. Surrounding the coil is a large permanent magnet 21 which has the shape of a torroid. (In the trade, magnets of this general shape are variously designated as "ring-shaped" and "cylindrical." I shall use "torroidal" to mean the same as either.) This magnet should be of a type which has a nearly straight-line demagnetization curve, the reason being that magnets having such a curve can be temporarily reduced to a zero-flux condition without losing appreciable magnetization. There are both cast-alloy and so-called "ceramic" types which have this characteristic. However, the device as illustrated has its general proportions tailored to suit the properties of certain ceramic types, in particular those which bear such trade designations as Indox I, Ferrimag I, and Arnox I. Magnet 21 is magnetized in the axial direction, as indicated by the N and S designations.

The magnetic circuit from one pole to the other of the permanent magnet is completed with the aid of both fixed and movable magnetically conductive structure. The fixed magnetically conductive structure is constituted by two generally disc-shaped pole members 22L and 22R. (For simplicity these members are each depicted as being constructed as a single piece. For quantity production it would be more economical to fabricate each from two or more pieces joined together.) The movable magnetically conductive structure is constituted by armature 23, similarly made of magnetic material. The latter component is movable by virtue of being mounted to slide longitudinally in tube 24 which is, in turn, joined fixedly to pole members 22L and 22R. (The tube is made of a nonmagnetic material, brass being a particularly suitable one, and so forms no part of the essential magnetic structure.)

The magnetic circuit defined by permanent magnet, pole members, and armature has within it two variable air gaps. One of these is between the left (as it appears to observer of drawings) end of armature 23 and the near surface of pole member 22L. The other is between the right end of the armature and the respectively near surface of pole number 22R. It should be noted that the two gaps are in series in a magnetic sense. It should be further noted that the arrangement is such that as one gap is opened the other gap is closed.

The magnetic material which is employed to shunt the respective gaps is in the form of two spaced segments, 25L and 25R. Each segment is round in lateral outline and sized to slide freely inside tube 24. The segments are positioned bracketing of armature 23. They are rigidly joined by ferromagnetic yoking bars 26. Slots 27 are provided in opposing sides of the armature to accommodate the bars, which slide freely through the slots. (In FIG. 1, the bar nearest the observer is shown broken away to reveal an empty slot.) The segments, as joined, are compelled to move together as a single unit which I call the "auxiliary armature," and which is indicated generally as 28. The travel of the auxiliary armature is limited only by the presence between its two magnetic segments of armature 23.

Besides having its permitted travel so limited, the auxiliary armature has exerted upon it at all times a bias tending to position it, or keep it positioned, centrally with respect to pole members 22L and 22R. The biasing force originates with springs 29L and 29R. These springs all respectively fastened at their inner ends, by clips 30, to the main body of the device and each spring is under tensile stress, so that it tends to contract and pull its outer end inward.

Retainers 31 are circular in their main portions, so that they maintain lateral alignment as they slide longitudinally in tube 24. Each retainer has two arms which stick out laterally and engage the outer end of one of the springs. These arms travel in longitudinal slots 32, four of which are provided in tube 24 to accommodate said arms. But the slots are of limited length, thus limiting the inward travel of the retainers. The arrangement is such that only one retainer can push on the auxiliary armature at one time; thus the springs do not dilute or cancel each other's effects.

Shaft 33 is affixed to the right end of armature 23 and extends therefrom out of the end of the device. As it extends it is reduced in diameter at one point, creating shoulder 34. The smaller-diameter portion of the shaft slides in cap-bearing 35 which is, in turn, affixed to the end of tube 24. Ferrule 36 is affixed (preferably by being staked or pinned) to the exterior portion of shaft 33. This ferrule and shoulder 34 serve, through the engagement of one or the other with cap-bearing 35, to limit the travel of armature 23.

On the opposite end of tube 24 from cap-bearing 35 a second cap 37 is provided. The latter is not required to serve as a bearing, but along with the former it serves to stiffen and brace the tube at points where it would otherwise be weakened by the presence of slots 32.

*Operation of illustrative embodiment of FIGS. 1–3*

In FIG. 1, the high-reluctance gap which would otherwise exist between the right end of armature 23 and pole 22R is shunted out. That is to say, the flux which would otherwise have to traverse the long air path from armature to pole member is provided with an alternate route; most of it goes by way of magnetic segment 25R and hence needs only traverse the thickness of the wall of tube 24 (the thickness of which wall is exaggerated in the drawing for the sake of clarity). Under the influence of permanent magnet 21, armature 23 is strongly urged to the left in order that the remaining gap in the magnetic circuit, that between pole member 22L and the left end of the armature, may be closed as far as possible, thus contracting the total reluctance to a minimum. The travel of the armature to the left is limited by ferrule 36, but the magneic urging will persist after the limit of travel is reached. Accordingly, the armature will not only "stay put" where it is halted, but will resist dislodgment from its terminal positioning with a force on the same order of that which produced its earlier movement. Meanwhile, the leftward positioning of auxiliary armature 28 puts a stretch on spring 29L which would tend to move said auxiliary armature to central positioning. But magnetic shunt 25R sticks magnetically to the right end of the armature with a force which is even greater (at that point) than the maximum actuating force of the device, so it is in no danger of being separated by the comparatively weak force of the spring.

The positioning of movable parts in FIG. 1 is thus highly stable. Not only is there no need for any mechanical latching or detent mechanism, but the resistance against dislodgment is much greater than such mechanical mechanism normally provides. Further, if the armature be forcibly moved, say, by some strong exterior force on shaft 33, even if it is moved all the way to the opposite end of its permitted travel it will return to the depicted position as soon as it is permitted to do so, exerting full operational force all the way back. This is because the magnetic force tending toward the closure of the left-hand gap cannot be abolished by any such maneuver. And once either of the magnetic segments gets stuck to a respective end of the armature, it will stay there despite any movements of the armature, just so long as the magnetic effect of the permanent magnet is not interfered with.

The only way to change the vigorously and stubbornly monostable condition of FIG. 1 is by temporarily eliminating (or considerably diminishing) the effect of permanent magnet 21. That's where coil 20 comes in. Exterior circuitry is normally provided that will, upon the closing of a switch included in said circuitry, energize this coil with a flow of direct current of such polarity and intensity that the resulting magnetomotive force developed in the magnetic circuit will oppose and approximately cancel out that due to the permanent magnet. With the magnetomotive force reduced to a low value, the magnetic flux and the magnetic attraction will be accordingly reduced to the point where spring 29L will be enabled to finally prevail over the attraction of segment 25R. In short, the effect of closing the postulated exterior control switch is to move the auxiliary armature from its position of FIG. 1 to its position of FIG. 2.

For purposes of normal operation of the device, the energizing current established by the closing of the switch need endure only long enough for the indicated shift of the auxiliary armature to take place. For a typical embodiment of small size, this requires only a few milliseconds. After that, the switch can be immediately reopened. Upon reopening, the condition of strong magnetization of the magnetic circuit by the permanent magnet will be restored. The renewed magnetization will find the left-hand gap magnetically shunted, instead of the right-hand gap, by virtue of the new position of the auxiliary armature. Despite any movement of the armature proper, segment 25L will remain stuck tightly to it. Prior to any such movement the shunting effect will not be immediatley evident, inasmuch as the flux path through the unmodified gap has a considerably lower reluctance than the shunting path initially provides. But let armature and shunt move to the right, and the shunting effect of 25L will make itself felt by keeping the reluctance at the left gap to a low, and even decreasing, value. Since a movement to the right produces a substantial decrease in the reluctance of the overall magnetic circuit, the armature will be strongly "attracted" to move in that direction, actuating as it goes any external load connected to shaft 33 and imparting a stretch to spring 29R.

When rightward motion is brought to a halt by shoulder 34 striking cap-bearing 35, the positioning which will have been achieved by movable parts will be (except for the shaft) the mirror image of that depicted in FIG. 1. The latter positioning will represent a second stubbornly stable situation. Once in said situation, a second brief energization of the coil will produce the same sequence of events just described, except that parts will move in the opposite direction, bring them ultimately back to the positioning of FIG. 1 and completing a full cycle.

It should be noted that in the sequence described it is the *relative* positioning of the auxiliary armature that counts. When a magnetic segment is applied to the left end of the armature, it is the left-hand gap which is effectively shunted. When a magnetic segment is applied to the right end of the armature, it is the right-hand gap which is effectively shunted. Thus there are really only two "shunting positions" for the auxiliary armature, those being considered in relation to the principal armature.

Figures 4, 5:
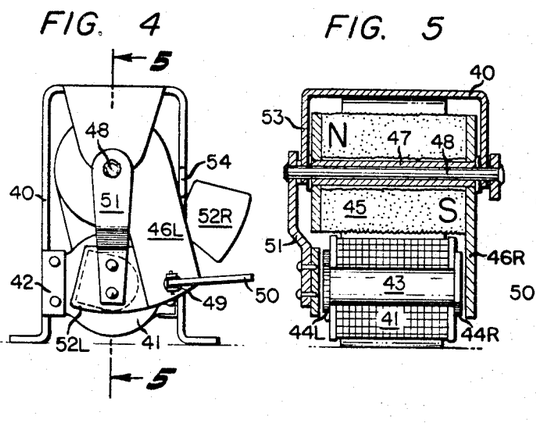
FIG. 4 is an elevation from one end.
FIG. 5 is a centrally sectioned view from one side. The rough lines in the latter figure indicate the rough sides of a magnet casting.
Figure 6:
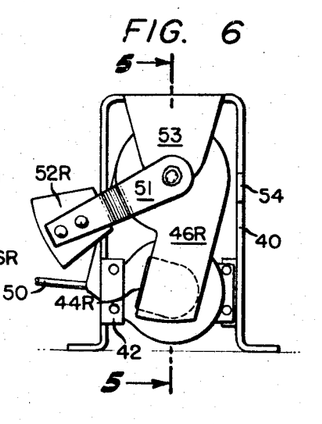
FIG. 6 is an elevation from the opposite end.
Figure 7:
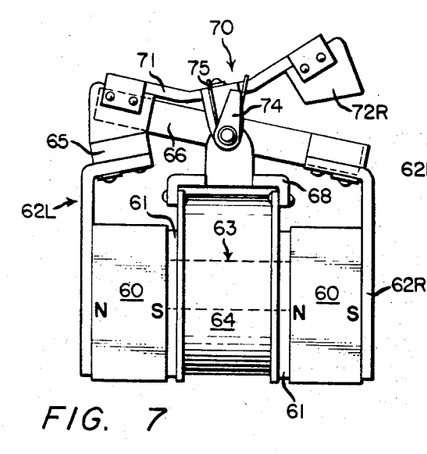
FIG. 7 may be taken as an elevation, although the device can be mounted in any position.
Figure 8:
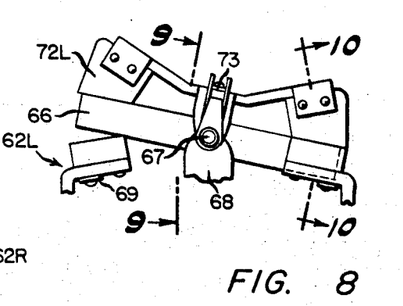
FIG. 8 is similar to FIG. 7 except that one component is shown in moved position, and the lower part of the device is shown broken away to avoid redundant representation.
Figure 9:
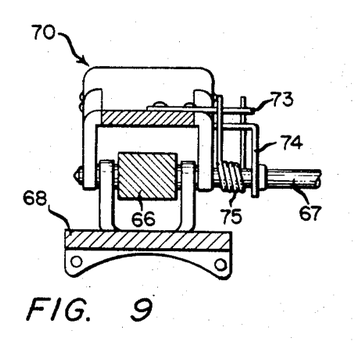
FIGS. 9 and 10 are sectional views of the upper parts when in the condition of FIG. 8 and sectioned respectively at points indicated in FIG. 8. (For the sake of clarity, FIG. 9 is drawn to a larger scale than its companion drawings.)
Figure 10:
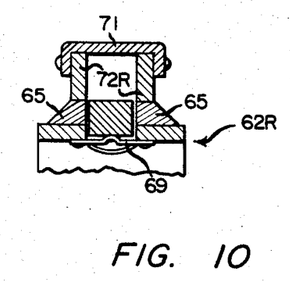

Construction of embodiment of FIGS. 4–6

All components are eventually supported by exterior frame 40, with the lower components being fixedly supported and the upper components being rotatably supported. Coil 41 is mounted by having its bobbin (or equivalent supporting flanges) riveted to ears 42 bent from the frame. Core 43 and its terminating flanges (or coil pole pieces) 44L and 44R are affixed by cement or other appropriate means within the coil.

In the upper portion, what can be called an "armature assembly" is defined by permanent magnet 45, magnet pole member 46L and 46R, and bearing-tube 47. The pole members are, of course, made of magnetic material, while the bearing-tube is made of non-magnetic material, brass being particularly suitable. Given the relative dimensions suggested by the drawings, the material of choice for the magnet is a cast Alinco having suitable properties. The components just named are joined into a unitary assembly by hard soldering or cement bonding. Shaft 48 serves as a pivotal support for the assembly, but is not otherwise connected to it. That is to say, the armature assembly rotates freely on the shaft. The motions of the armature assembly are transmitted to an exterior load through different means, specifically through pivotal clevis 49 and pusher-rod 50.

Supporting shaft 48, meanwhile, makes up part of a separate, unitary, and movable assembly which will be called the "auxiliary armature assembly." Besides the shaft, the latter assembly includes two arms 51 and magnetic segments 52L and 52R. Of these component pieces, only the magnetic segments are made of magnetic materials. The arms are welded to the shaft and the segments are riveted to the arms, the total assembly revolving as a unit about the axis of the shaft. This is an unbalanced construction, and deliberately so, from a gravitational standpoint. The overall device is designed to be mounted in the position shown. Consequently, when not magnetically held in their depicted positions, the two segments will tend to hang in positions equidistant from the extended axis of core 43. It should be carefully noted that such a response to gravity would bring segment 52R into engagement with pole piece 46R, and would disengage segment 52L from pole piece 46L (provided the armature assembly were not moved in the meantime). The unbalanced construction is, in itself, a specific means, a means duplicating the function of springs 29 (with their associated components) in the embodiment of FIGS. 1–3.

Shaft 48 passes through holes drilled in ears 53 of frame 40, said holes serving as bearings, so that armature assembly and auxiliary armature assembly are supported, in their separate and independent free rotations about a common axis, ultimately by the exterior frame. Two projections 54, from the frame serve to limit the travel of the armature assembly in both directions of rotation. Thrust washers are provided to control end play for both assemblies and to prevent one from binding against the other.

Operation of embodiment of FIGS. 4–6

In studying the operation, one should beware of ascribing one function to fixed magnetic structure and a different one to movable magnetic structure. All that counts in a magnetic sense is the relative movement which varies the reluctance of the air gaps. The name "armature" is herein applied always to the movable portion, for convenience and in accordance with common usage, but such usage should not be allowed to confuse comparison of the embodiments. Thus, the fact that in the subject embodiment the permanent magnet forms a part of the "armature assembly" is only incidental. What is central is that the magnet provides the mmf. for a magnetic circuit made up of fixed and movable structure, said structure providing two variable air gaps in series, the arrangement being such that as one gap opens the other closes, and vice versa.

By way of further comparison with previously described embodiment, it will be noted that in the presently treated embodiment the coil surrounds fixed, rather than movable, magnetic structure. It should be noted that it doesn't make any difference on the level of principle which part of the magnetic circuit is surrounded. However, the term "surround" should be applied with caution, as it may lead to topological difficulties. What is important is that the flow of current should *link with* the "flow" of flux. Otherwise stated, if a coil or winding is to be used to temporarily "demagnetize" a magnetic circuit magnetically energized from another source, then the coil or winding must be mounted in *"linking relationship"* to the magnetic circuit.

The basic magnetic circuit of subject embodiment is readily traced. Starting with the "North" pole of the magnet, the flux path extends first from the circular portion of pole member 46L to the terminus of said member where a variable air gap is defined between the member and core flange 44L, thence through said gap, core 43 and a corresponding gap at the other end of the core, and finally back through pole member 46R to the "South" pole of the magnet. Rotation of the armature assembly closes one gap (by increasing its area) as it opens the other gap (by decreasing its area). Accordingly, if either gap is effectively shunted, magnetic "attraction" will act vigorously to rotate the assembly to close the other gap.

The function of shunting is fulfilled by the respective magnetic segments of the auxiliary armature assembly. A segment is in position to shunt its corresponding gap when it is in contact with the inner side of the extending part of the corresponding pole member. Thus, as may be seen best from FIG. 4, the situation of FIGS. 4–6 is one in which the left gap in the basic magnetic circuit, i.e., that between core flange 44L and pole member 46L, is shunted. The positioning of movable parts is highly stable, and would be a terminal consequence of the earlier application of segment 52L to pole member 46L when the armature was at the opposite extreme of its permitted rotation. Whatever the instantaneous position of the armature assembly, a segment will stick magnetically to a pole member when once applied thereto (in the absence of any current flow through coil 41).

Meanwhile, gravity and the unbalanced construction of the auxiliary armature will, in the situation of FIGS. 4–6, tend to create a force tending to release segment 52L and to apply instead (to the opposite pole piece), segment 52R. To permit this gravitational force to be effective when an operational stroke is desired, coil 41 is energized just long enough for the shift of the auxiliary armature to take place, and is then de-energized again. Upon deenergization, the strong magnetic attraction originating with the permanent magnet will propel the movable parts until they reach a terminal position which could be represented in FIGS. 4 and 6 by transposing the actual representations therein. This will complete a first half-cycle of operation. The second half-cycle can be obtained in a manner in every way identical except for directions of motion.

*Construction of embodiment of FIGS. 7–10*

The two permanent magnets 60 are rectangular in cross section. Their respective polar faces are covered inwardly by plates 61 and outwardly by pole members 62L and 62R. Connecting plates 61 together is core 63, circular in section, which is visible only in dashed outline in FIG. 7. Solenoidal coil 64 coaxially surrounds the core. The components thus-far named are bonded rigidly together. All but the coil are, of course, made of magnetic materials.

The pole members are bifurcated at their upper extremes, and have extensions 65 riveted to them to increase the inward-facing areas of the bifurcated portions. (The extensions will hereinafter be treated as subsidiary parts of the pole members proper.) Pivotally mounted in generally bridging position across the terminations of the pole members is armature 66. The armature pivots around the axis of shaft 67, which penetrates it completely. Shaft and armature are rigidly joined, as by a press-fit supplemental by a pin or a set screw, so that they turn together, the shaft serving to transmit the operational movements of the armature to any exterior load to be actuated. The shaft, in turn, is supported by bracket 68, turning freely in bearing-holes through the upward-bent ears thereof. Finally, the bracket is supported by the fixed structure already set forth, by means of being riveted to the flanges of the bobbin (or equivalent structure) of coil 64. Bracket 68 is made of non-magnetic material. Meanwhile, the pivotal travel of the armature is limited in both directions by stop strips 69, also made of non-magnetic material, affixed to the respective pole members.

Pivoting about the same axis as the armature proper is an auxiliary armature indicated generally at 70. The principal parts of the auxiliary armature are a carrier 71, which is made of non-magnetic material, and two pairs of segments of magnetic material designated respectively as pair 72L and pair 72R. The auxiliary armature pivots freely on shaft 67 by virtue of the shaft being inserted with a free fit through holes in the central downward-bent ears of carrier 71. Other ears, at the extremities of the carrier, are utilized to rivet the magnetic segments integrally to it. A thin, stiff strip of metal 73, is riveted to the top of the carrier to provide a forward extension therefrom for purposes to be immediately described.

Mounted fixedly to shaft 67 (as by spot-welding or staking) is a bracket 74, whose extremity is placed to lie close to and parallel with srtip 73. Torsion spring 75 is mounted around the shaft and with its straight ends embracing both strip 73 and bracket 74. This spring exerts considerable "squeeze" between its ends even when relaxed as far as permitted by the situation of FIG. 8. Thus, its effect is to yieldably urge the auxiliary armature to follow the principal armature in a rotational sense. When the rotational position of the respective elements differs only a little the restoring force will nevertheless be near the maximum, due to the initial tension on the spring.

*Operaiton of embodiment of FIGS. 7–10*

It is important to take note of certain differences between subject embodiment and those previously described. First, it will be noted that there are two permanent magnets instead of one. However, these are connected in series in a magneitc sense, and those skilled in the art will appreciate that on a level of magnetic principle two thin magnets so connected are the full equivalent of one thicker one.

Second, it will be noted that the magnetic material in the auxiliary armature which is used for shunting purposes is applied for such purposes to fixed magnetic structure rather than to the terminations of a movable "armature." However, as has already been stated, a gap can be shunted from either side, and on the level of principle it makes no difference from which. On the practical level, the difference is that positions of the shunting material are taken in the one instance relative to movable structure and in the other instance relative to fixed structure. It follows that requisite biasing affecting the shunting material must be exerted from conversely altered basis points. Whereas in the earlier-described embodiments the biasing was exerted relative to fixed points, in the presently described embodiment the biasing must be exerted relative to the instantaneous positioning of the principal armature. This may be done in various ways, the one depicted being merely representative.

The basic similarity to other embodiments having been pointed out, there is no need for an extended description of the operation of present embodiment. It will be evident that the situation of FIG. 7 will be a stable one, in the absence of coil energization, despite the tension on spring 75 and despite any operationally normal counter-torque exerted by the assumed exterior load on shaft 67. It will likewise be evident that a flow in coil 64 of a current of proper polarity and intenisty to substantially demagnetize the magnetic circuit for an instant will result in a shift by auxiliary armature 70 to its position of FIG. 8. In the latter position, segments 72R will shunt the gap at the right end of the armature. When magnetization is restored, the armature will be strongly impelled in a counterclockwise direction, and so on.

Figure 11:
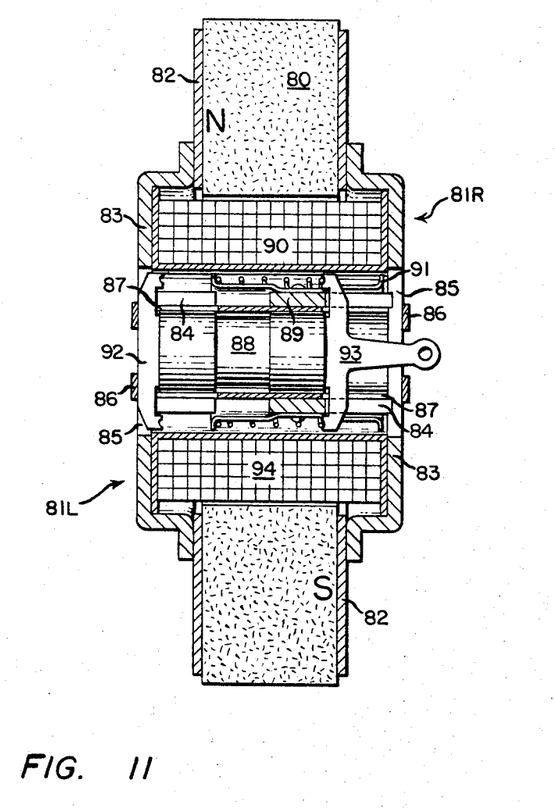
FIG. 11 is descriptive of a fourth embodiment of the invention. It is a central sectional view, with smaller central parts left unsectioned, as appropriate. It shows the device with movable parts in one of the two patterns of positioning which are stably held in the absence of coil energization and terminally reached after the cessation of previous energization. (The alternate pattern of stable positioning is essentially the mirror image of the one shown.)

Construction of embodiment of FIG. 11

As does its counterpart in the embodiment of FIGS. 1–3, magnet 80 has the shape of a torroid. It is similarly magnetized in the axial direction. The pole members, indicated generally at 81L and 81R, are each actually made up of component pieces. These are: flat rings 82, which are affixed to the respective polar faces of the magnet; dish-shaped pieces 83 which are spot-welded to the aforesaid, and pieces 84 which have the shape of longitudinally split cylinder halves and are mounted in pairs, by welding or hard soldering, in circular grooves turned in the inner faces of dishes 83. All listed components of the pole members are made of magnetic materials. Dishes 83 are penetrated centrally by elongated slots 85 (vertically disposed in the illustration) which are aligned with the gaps between pairs of cylinder halves 84 to provide, in effect, one continuous opening, long and narrow in lateral section, extending longitudinally (that is, in axial direction) of the device-as-a-whole completely through each assembled pole member. This opening is externally blocked on each pole member by a pair of rigid straps 86 spot-welded crosswise of the opening.

Tube 87 fits snugly inside the split-cylinder portion of each pole member, and is affixed thereto. It is split at each end to provide open-ended longitudinal slots in its sides which match the respective openings in the pole members. The tube is preferably made of brass. Its purpose is to act as a sliding-type bearing for both inner and outer movable parts. Armature 88 slides lengthwise through its interior, and shunting ring 89 slides lengthwise on its exterior.

The shunting ring just mentioned is made of magnetic material and is, all by itself, the full equivalent of the "auxiliary armature," or "auxiliary armature assembly" to be found in each of the other embodiments. For purposes of resiliently coupling the shunting ring to the armature for biasing purposes, compression spring 90 is provided. This spring is supported by a generally cylindrical retaining thimble 91. Both spring and thimble must be made of nonmagnetic materials, Phosphor bronze and beryllium copper being suitable. The retaining thimble is riveted or otherwise affixed to shunting ring 89, and is almost bisected in a longitudinal sense by slots in its sides extending inwardly from both ends. Alternatively, it is actually made up of two unconnected halves, each of which is separately affixed to the shunting ring in a manner leaving two diametrically opposed gaps between them. (For clarity, the latter is the arrangement actually depicted in the drawings.)

Armature 88 is diametrically slit for a short distance in from each end. In the slits thus formed are affixed (most conveniently, with a modern bonding agent) respective motion-transmitting blades 92 and 93, which are made of a nonmagnetic sheet metal. The radially outward extensions of these blades operate in the slots provided in pole members 81L and 81R, tube 87, and thimble 91. The longitudinal span between the lateral extremities respectively of blades 92 and 93 is slightly less than the overall length of thimble 91, so that thimble and shunting ring are kept from rotating, and one or the other of the blades is always free to enter a slot-pair in the thimble. When either blade enters the thimble slots (or between the thimble halves), its ends pick up spring 90 and compress the latter against the longitudinally opposite end of the thimble construction. The shunting ring is thus biased toward that end of its permitted travel which corresponds with the extreme of its respective travel at which the armature is found at a given instant. With the device in the condition depicted, the shunting ring is biased to break contact with pole member 81R and move to the left to engage pole member 81L. (The spring is always under compression, even when extended as far as the thimble length will permit. Thus the force transmitted from armature to shunting ring is a relatively constant one, whatever the divergence of their positioning.)

Blades 92 and 93 fulfill further functions. By coming into engagement with stop straps 86, they limit the travel of the armature in both directions. Further, blade 93, through its longitudinal extension to the right, provides for coupling the device to an external load to be actuated.

Coil 94 is of the solenoidal type and is mounted to coaxially surround all the inner parts and to be surrounded in turn by the permanent magnet. No particular mounting measures are required, the coil being held in place by its surrounding structure. The only critical positioning consideration is with regard to lateral alignment. Such alignment is achieved by means of a fit between the flanges of the coil bobbin and the corresponding interiors of pole members 81L and 81R. For maximum precision, the larger internal diameters of the latter members are "cleaned up" on a lathe or similar tooling at the same time the circular grooves for split cylinders 84 are formed.

Operation of embodiment of FIG. 11

The subject embodiment, as drawn and described, should be compared with that of FIGS. 1–3. It will be noted that the devices of the respective embodiments each provide two magnetically conductive pole members which cover respectively the two ends of coil and magnet and provide, in addition, central openings into and out of which the armature slides. In the case of each embodiment the structure defining these central openings is longitudinally extended to define what might be called cylindrical bores of substantial depth. Those skilled in the art will appreciate that the purpose of such extension is to provide for the desired length of stroke, and to secure minimal reluctance in each gap at the end of the stroke. But the observer may be struck by the fact that where the extension is longitudinally *outward* in the earlier-described embodiment, it is longitudinally *inward* in the presently-described embodiment. This change has no great significance from a magnetic standpoint, but it does make for a shorter armature and a shorter overall device.

A more important difference between the two embodiments is that the shunting of each gap is done in the former instance from the movable side and in the present instance from the fixed side. As has been emphasized, considered in terms of magnetic circuitry this makes no difference. On the purely mechanical side, however, it has significant and important consequences.

In any event, it should be clear that as long as shunting ring 89 is in engagement with pole member 81R (actually, with the split-cylinder part thereof), the right-hand gap will be shunted and armature 88 will be impelled to the left. It will also be clear that even after the armature reaches the leftward end of its travel (the situation depicted in FIG. 11) and puts a bias, by means of spring 90, on the shunting ring to likewise move to the left, said ring will remain magnetically stuck in place. Finally, it should be clear that if coil 94 is energized to a degree sufficient to buck out the effect of the permanent magnet for an instant, the shunting ring will move over to engage pole member 81L and it will thenceforth be the left-hand gap which is shunted, with appropriate consequences.

General considerations

In the cases of all embodiments, ti should be understood that the respective coils are provided with terminals, pigtail leads, or other appropriate means for making connection with exterior circuitry. In order to avoid complicating or obscuring the drawings with minor details, such arrangements are not expressly shown.

Since the purpose of an actuator is to actuate, each of the illustrative embodiments includes some sort of means for providing mechanical connection to exterior loads to be worked. For most applications, it is desirable that the force delivered by an actuating element be reasonably constant as the stroke progresses. This is a requirement which is seldom met in comparable priorart devices, because the particular gap constructions which are nearly always used make it difficult or impossible. However, there is no such problem in connection with embodiments of the present invention, as the sort of gap construction which lends itself to temporary shunting arrangements also lends itself to the incorporation of measures to keep the force-vs-stroke curve relatively flat.

In general, what is required to this end is that the rate of decrease of total magnetic circuit reluctance should be one that rises as the stroke progresses, but it must not rise too fast. Such a moderately rising rate of reluctance decrease is achieved in the illustrative embodiments in various ways. In the embodiment of FIGS. 1–3 it is achieved by means of the taper at each end of the armature. Only a very slight taper is required, since its effect is felt at both gaps at once, and since the saturation effects which the taper compensates for are lower than would be anticipated by one familiar only with prior-art devices. (The taper in the drawings is actually exaggerated for the sake of clarity.)

In the cases of the two respective embodiments of FIGS. 4–10, in these the reluctance is made to change more rapidly as the stroke progresses by arranging that the increments of area "swept" by the advancing armature are progressively larger as the stroke continues.

Finally, in the embodiment of FIG. 11, some of the initial decrease in reluctance at the closing gap is bucked out by a slight increase at the opening gap, this being an effect which can be regulated by determining the size of the reduced-diameter portion of the armature. Also, for the latter part of the stroke there is a substantial decrease in reluctance due to the fact that the slot in each pole member is of considerably less area than the hole through tube 87. That is to say, the magnetic material remaining on either side of the slot faces the given end of the armature and reduces the reluctance thereto. This latter effect is kept from becoming excessive by arranging to stop the armature somewhat short of actual end-contact with either pole member.

The descriptions of the various illustrative embodiments should be regarded as interrelated. That is to say, any point which is not understood by reference to one embodiment may well be clarified by reference to another embodiment. When a full understanding of the central invention has been achieved, it will readily be perceived that the embodiments, despite their many superficial differences, are equivalent at the level of the central invention. In this connection, it should be carefully noted that other, and superficially quite different, embodiments which might have been described have been excluded from this document lest it be unduly burdened. In the light provided by the present disclosure, however, certain prior-art devices will suggest themselves for modification into devices partaking of the present invention. In particular, certain devices taught in my Patent No. 2,885,606, issued May 5, 1959, for "Impulse Type Electromotive Device" will be found suitable for modification to represent additional species under the present invention. (An interesting candidate in the cited reference disclosure is the embodiment of FIGS. 12–13, which would form the basis for a new species having *two armatures*.) For these valid reasons, I do not consider my invention to be limited to the details of the embodiments described, but only as hereinafter claimed.

To say that all disclosed embodiments are equivalent at the level of the central invention is *not* to say that none is further inventive of and by itself. The embodiments of FIGS. 1–3 and FIG. 11, in particular, represent further invention, above and beyond the central invention, because of the ingenious solutions they bring to certain problems. One inventive feature is the torroidal permanent magnet mounted coaxially with coil and armature, a construction which has never been previously used in devices of the given class. Its advantages are that it keeps the path through magnetically conductive structure extraordinarily short for all of the flux, and that it nevertheless accommodates a magnet having large areas on its polar faces. (A large ratio of cross-sectional area to length is characteristic of the modern "ceramic" magnets which are so well suited for use in devices according to the invention.)

Further, the embodiment of FIG. 11 features a particular construction which cuts down the longitudinal size of the device, reduces the "auxiliary armature" to its ultimate simplicity, and eliminates one of the springs necessary in the FIGS. 1–3 construction.

Each described embodiment is, of course, the best mode of practicing the total invention that it represents. Each embodiment has, by comparison with the others, certain advantages and disadvantages, so that the choice between them will be determined by the details of the intended application. It might be helpful to mention here that the embodiment of FIGS. 4–6 is particularly suited for large, stationary installations where its speed of actuation would be relatively slow. It could, for instance, be used for pumping water. The embodiment of FIGS. 7–10, on the other hand, can be designed for low moment-of-inertia, can be completely counterbalanced, and can be used in any position. It thus forms an excellent foundation for relays of various sizes (a "relay" being created from an "actuator" simply by providing electrical switching means as the load to be actuated).

When I speak herein of "magnetic material", unless I further qualify the term I have particular reference to those so-called "soft" magnetic materials which readily magnetizable and readily de-magnetizable as well. (Exemplary materials are low-carbon irons and certain silicon steels.) When I speak of "magnetically conductive" structure or components, I mean to imply construction from the materials just indicated.

I use the word "opening' 'in its generic sense, and it should be considered to embrace such concepts as slots, receptacles and truncated bores.

With respect to the adjacent magnetically conductive parts which define a variable air gap, I have previously stated herein that it is the relative movement of said parts which is important. Therefore, a workable embodiment of the invention could be constructed which would apparently have no fixed magnetic structure whatsoever. Such a construction would lend no advantage and would, indeed, be rather impractical. However, it should be clearly understood that the movable magnetically conductive structure components in such a construction would be respectively the full equivalents of the fixed and movable components which appear in the illustrative embodiments. That is to say, I do not use the word "fixed" in such a strict sense that it would not be applicable to a movable frame of reference.

Similarly, a workable embodiment of the invention could be constructed in which portions of the permanent magnet could be used to fulfill the functions of either the fixed or the movable portions of the magnetically conductive structure normally required. It should be clearly understood that I contemplate such a possibility, and I intend the term "magnetically conductive structure" to be applicable to small portions of the permanent magnet when such application is warranted by the use made of such portions.

What I claim is:

1. An electromechanical actuator for use with energizing circuitry which provides as required electrical current impulses of given polarity and brief duration, said actuator comprising:

a permanent magnet;

fixed and movable magnetically conductive structure arranged to define in conjunction with the permanent magnet a closed magnetic circuit having therein two variable reluctance air gaps in series, the mounting arrangement of the movable portion of said magnetically conductive structure being such that as one of said air gaps is opened the other is closed and vice versa;

auxiliary armature means for selectively shunting one or the other of the variable-reluctance air gaps to counteract at each gap when shunted the increase in reluctance otherwise associated with gap opening, said auxiliary armature means being at least partially constructed of magnetic material and being mounted to be movable as a unit to engage the magnetically conductive structure alternatively at one or the other of the gaps, each shunting engagement tending to persist by virtue of the magnetic attraction generated by the permanent magnet;

biasing means responsive to the relative motions of the magnetically conductive structure for yieldably urging the auxiliary armature means toward positioning to shunt whichever of the variable air gaps is instantaneously closed;

and demagnetizing means for momentarily reducing the magnetic attraction effective upon the auxiliary armature means to the point where said auxiliary armature means will respond to the urging of the biasing means by shifting shunting positions accordingly, said demagnetizing means comprising at least one coil or winding mounted in linking relationship to the magnetic circuit and adapted to be connected to the energizing circuitry in that polarity according to which the magnetomotive force resultant from the current flow opposes that of the permanent magnet.

2. The electromechanical actuator of claim 1 wherein the auxiliary armature means is arranged, for making its shunt-effecting engagements with the magnetically conductive structure, to make each of such engagements with the movable portion of said structure.

3. The electromechanical actuator of claim 1 wherein the auxiliary armature means is arranged, for making its shunt-effecting engagements with the magnetically conductive structure, to make each of said engagements with the fixed portion of said structure.

4. The electromechanical actuator of claim 1 wherein it is provided by the construction of the auxiliary armature means that the component magnetic material therein which is operationally effective is located in two spatially separated portions of said means, said separated portions being operationally applied in alternate order each at a respective air gap.

5. The electromechanical actuator of claim 1 wherein it is provided by the construction of the auxiliary armature means that all of the component magnetic material therein which is operationally effective is combined in a single magnetically unitary member which is operationally applied at both gaps in turn.

6. An electromechanical actuator, comprising:

a solenoidal coil adapted to be intermittently energized by current impulses of given polarity;

an armature mounted for limited lengthwise travel through the hole in the coil;

a toroidal permanent magnet magnetized in the axial direction and mounted to coaxially surround the coil;

two magnetically conductive pole members mounted to each substantially cover a respective end of the coil and magnet as assembled, said pole members each providing an axially located opening adapted to admit a respective end of the armature at a respective terminus of the permitted travel thereof, thereby defining a variable-reluctance air gap between each end of said armature and a respective pole member;

means for magnetically shunting one or the other of the variable reluctance gaps, said means comprising an auxiliary armature at least partially constructed of magnetic material and mounted to be movable reciprocatively between two relative operational positions in each of which it provides a supplemental flux path between armature and pole member and is thereby magnetically held in position by virtue of the magnetomotive force generated by the permanent magnet except at such times as the coil is appropriately energized to produce a counteracting magnetomotive force;

and biasing means responsive to the motions of the armature for yieldably urging the auxiliary armature into operational positioning to shunt the gap between armature and that pole member into which it is instantaneously inserted.

7. The electromechanical actuator of claim 6 further characterized in that:

the auxiliary armature comprises two spaced segments of magnetic material and yoking structure rigidly connecting said segments, said auxiliary armature being mounted for lengthwise motion on the extended longitudinal path of the armature with said segments longitudinally bracketing said armature;

and the biasing means comprises resilient structure arranged to urge the auxiliary armature toward positioning symmetrically central with regard to the pole members.

8. The electromechanical actuator of claim 7 further characterized in that:

the auxiliary armature essentially comprises a cylinder of magnetic material mounted to slide longitudinally in position coaxially exterior of the armature and interior of the coil;

and the biasing means comprises resilient structure so linking the auxiliary armature to the armature as to bias the former to move in the same direction as the latter.

References Cited

UNITED STATES PATENTS

| 2,972,091 | 2/1961 | Clements | 335—253 |
| 3,344,377 | 9/1967 | Clements | 335—259 |
| 3,022,450 | 2/1962 | Chase | 335—253 XR |
| 2,885,606 | 5/1959 | Clements | 335—253 |
| 3,070,730 | 5/1962 | Gray | 335—253 XR |
| 3,281,739 | 10/1966 | Grengg | 335—253 XR |
| 2,515,259 | 7/1950 | O'Brien et al. | 335—253 |
| 2,322,913 | | Best | 103—53 |

FOREIGN PATENTS 845,676 Germany.

J D MILLER, *Primary Examiner.*

B. A. REYNOLDS, *Assistant Examiner.*

U.S. Cl. X.R.

310—12, 26, 30; 335—253

UNITED STATES PATENT OFFICE
CERTIFICATE OF CORRECTION

Patent No. 3,419,739                          December 31, 1968

Warner W. Clements

It is certified that error appears in the above identified patent and that said Letters Patent are hereby corrected as shown below:

Column 16, line 43, the claim reference numeral "7" should read -- 6 --.

Signed and sealed this 20th day of January 1970.

(SEAL)
Attest:

Edward M. Fletcher, Jr.                     WILLIAM E. SCHUYLER, JR.
Attesting Officer                              Commissioner of Patents